United States Patent [19]
Izumi et al.

[11] Patent Number: 5,695,546
[45] Date of Patent: Dec. 9, 1997

[54] METHOD FOR COLLECTING VOLATILE ORGANIC SUBSTANCES

[75] Inventors: Jun Izumi; Akinori Yasutake; Hiroyuki Tsutaya, all of Nagasaki; Takayuki Harada; Kenichi Hamada, both of Shimonoseki, all of Japan

[73] Assignee: Mitsubishi Jukogyo Kabushiki Kaisha, Tokyo, Japan

[21] Appl. No.: 646,633

[22] Filed: May 8, 1996

[30] Foreign Application Priority Data

May 10, 1995 [JP] Japan ..................... 7-112055

[51] Int. Cl.$^6$ ............... B01D 53/04; B01D 53/26
[52] U.S. Cl. ............... 95/115; 95/113; 95/123; 95/125; 95/143; 95/144; 95/147
[58] Field of Search ............... 95/41, 96, 113, 95/115, 117–126, 143, 144, 147

[56] References Cited

U.S. PATENT DOCUMENTS

| | | | |
|---|---|---|---|
| 3,080,692 | 3/1963 | Staley et al. | 95/113 X |
| 3,719,026 | 3/1973 | Sand | 95/143 X |
| 3,732,326 | 5/1973 | Chen | 95/143 X |
| 4,153,428 | 5/1979 | Saunders et al. | 95/125 X |
| 4,409,006 | 10/1983 | Mattia | 95/113 |
| 4,455,444 | 6/1984 | Kulprathipanja et al. | 95/143 X |
| 4,480,393 | 11/1984 | Flink et al. | 95/122 X |
| 4,846,852 | 7/1989 | Schweitzer et al. | 95/125 |
| 5,220,796 | 6/1993 | Kearns | 95/123 X |
| 5,221,520 | 6/1993 | Cornwell | 95/117 X |
| 5,346,535 | 9/1994 | Kuznicki et al. | 95/96 |
| 5,389,125 | 2/1995 | Thayer et al. | 95/115 X |
| 5,417,742 | 5/1995 | Tamhanker et al. | 95/96 |
| 5,425,242 | 6/1995 | Dunne et al. | 95/119 X |
| 5,512,083 | 4/1996 | Dunne | 95/113 |
| 5,536,301 | 7/1996 | Lansbarkis et al. | 95/117 |

FOREIGN PATENT DOCUMENTS

| | | | |
|---|---|---|---|
| 0 215 472 | 3/1987 | European Pat. Off. | |
| 3614450 | 11/1987 | Germany | |
| 03-135410 | 6/1991 | Japan | 95/96 |
| WO88/06481 | 9/1988 | WIPO | 95/117 |

OTHER PUBLICATIONS

*Principles of Adsorption and Adsorption Processes*, Douglas M. Ruthven, 1984, John Wiley & Sons, Inc., New York, pp. 8–19.

Patent Abstracts of Japan, vol. 008, No. 085 (C–219), Apr. 18, 1984 & JP–A–59 006924 (Kuraray KK) Jan. 14, 1984 (abstract).

*Primary Examiner*—Robert Spitzer
*Attorney, Agent, or Firm*—Wenderoth, Lind & Ponack

[57] ABSTRACT

A method for collecting volatile organic substances from off-gas containing moisture and volatile organic substances. After the moisture has been removed by a dehumidifying tower filled with moisture absorbent for selectively adsorbing the moisture from the gas containing the organic substances and the moisture, the organic substances are adsorbed and removed under a relatively low temperature condition. The organic substances is desorbed under a relatively high temperature condition from the adsorbing tower which is saturated with the organic substances. The desorbed organic substances are liquefied and collected under a low temperature and/or pressurizing condition. The dry gas from which the organic substances have been removed and made harmless is heated if necessary. Thereafter, the dry gas is purged in a counter flow manner in the dehumidifying tower which is saturated with the moisture to perform the regeneration of the moisture absorbent and is discharged to the outside of the system together with the desorbed moisture.

4 Claims, 2 Drawing Sheets

METHOD FOR COLLECTING VOLATILE ORGANIC SUBSTANCES

BACKGROUND OF THE INVENTION

The present invention relates to a method for collecting volatile organic substances from off-gas containing moisture and volatile organic substances.

Volatile organic substances such as acetone, toluene, methyl ethyl ketone (MEK), ethyl alcohol, isopropyl alcohol, cyclohexanone (hereinafter simply referred to as organic substances) have been widely used in various plants in the chemical, electronics and mechanical industry and the like. Discharging the off-gas containing the organic substances from these plants without any treatment is severely regulated in view of environmental protection. For this reason, there have been proposed various methods of treatment which are actually put into practice. Of these treatments, the most typical method, i.e., an activated carbon adsorption-steam regenerating method will be explained as follows. The off-gas containing the organic substances is introduced at a room temperature into an adsorbing tower, which has been filled with the activated carbon, to remove the organic substances, and then the resulting non-harmful off-gas is discharged to the atmosphere. The organic substances adsorbed on the activated carbon are desorbed by steam at a high temperature. The steam containing the organic substances is condensed. The water phase and the organic phase are separated for collecting the organic substances.

In this method, since the activated carbon is of a hydrophobic adsorbent, the adsorbed organic substances are effectively desorbed due to the flow of the steam, and the reoperation in the drying step and the adsorbing step subsequent to the steps of drying and cooling the activated carbon is effectively carried out. Also, the separation of the organic substances and the steam is generally easy to conduct through a low temperature condensation of the steam. For this reason, this method has been extensively used. However, as a problem to be solved, since the steam is used for regenerating the adsorbent, the organic substances would be subjected to thermal decomposition due to the catalytic effect of the activated carbon at a high temperature, so that it would be difficult to reuse the organic substances. Otherwise, part of the organic substances remain on the activated carbon to deteriorate the adsorbing property. Also, there is a fear that, in the process for collecting the organic substances from the condensed water by condensing the steam containing the organic substances, part of the organic substances would be dissolved in the condensed water to cause secondary contamination such as water pollution.

On the other hand, another method has been proposed as follows. Hydrophobic zeolite having a high $SiO_2/Al_2O_3$ ratio is used as the adsorbent to adsorb the organic substances at room temperature, and then the resulting non-harmful off-gas is discharged from the system. The adsorbed organic substances are desorbed at a high temperature while introducing the air kept at a high temperature into the adsorbing tower. The collected organic substances are introduced into a catalytic combustion unit to be burnt and collected as a heat quantity. In this method, since the high temperature air is used as a regeneration gas, the problem of the secondary contamination such as the water pollution due to the dissolution of the organic substances in the condensed water of the steam might be overcome. However, due to the regeneration through the high temperature air, it would be difficult to collect and reuse the thermally unstable organic substances such as cyclohexanone, MEK. After all, the solvent or the like (volatile organic substances) which has been collected is used as fuel. In view of a resource saving aspect, needless to say, it is inherently desirable to collect and reuse the organic substances.

The above-described method for collecting the organic substances by the adsorbent suffers from a problem that the adsorbed organic substances are desorbed by the air or the steam at the high temperature so that the organic substances are subjected to the thermal decomposition to degrade the quality of the collected organic substances. Also, this regeneration method by the steam suffers from secondary contamination such as water pollution due to the dissolution of the organic substances in the condensed water. If the temperature of the adsorbent regenerating process is lowered, it is possible to avoid the thermal decomposition of the adsorbed organic substances. However, since the difference of the temperature between the adsorbing temperature and the regenerating temperature is small, the amount of the adsorbent to be used is greatly increased as well as the condensed rate is decreased, thereby resulting in an economic disadvantage. As the only method that is available, the regeneration is carried out at the low temperature while, in the same way as the conventional method, the difference of the temperature between the adsorption and the regeneration is kept constant by lowering the adsorbing temperature in the adsorbing process. However, if the adsorbing process of the organic substances would be carried out at a temperature lower than a room temperature, due to the moisture in the range of about 0.5 to 3 vol % contained in the off-gas, a large amount of energy is required to condense the steam in the cooling process for the off-gas. Also, part of the organic substances are dissolved into the condensed moisture, resulting in water pollution in the same way as is experienced in steam regeneration.

SUMMARY OF THE INVENTION

In view of the foregoing defects inherent in the prior art, an object of the present invention is to provide a method for collecting volatile organic substances for selectively collecting only organic substances from gas containing organic substances and moisture.

According to the present invention, there is provided a method for collecting the volatile organic substances by processing gas containing volatile organic substances and moisture with adsorbent and moisture absorbent, comprising the following steps of:

introducing the gas containing the volatile organic substances and the moisture into a dehumidifying tower filled with the moisture absorbent for selectively adsorbing the moisture and being in an adsorbing process under a relatively low temperature condition to remove the moisture, and thereafter causing the gas to flow through an adsorbing tower filled with the adsorbent and being in a dehumidifying process under a relatively low temperature condition to adsorb and remove the volatile organic substances;

desorbing the adsorbed moisture, by causing the gas from which the moisture and the volatile organic substances have been removed, to pass through the dehumidifying tower being in a moisture absorbent regenerating process under a relatively high temperature condition, and discharging the gas outside the system together with the desorbed moisture;

causing a high concentration volatile organic substances containing gas the volatile organic substances adsorbed by causing part of the gas from which the moisture and the volatile organic substances have been removed, to pass through the adsorbing tower being in the removal process under a relatively high temperature condition;

introducing the high concentration volatile organic substances containing gas into a liquefier, cooling and/or pressurizing the gas to be liquefied to collect the volatile organic substances; and returning the gas from which the volatile organic substances have been separated in the liquefier, back to the adsorbing process of the volatile organic substances.

According to the method of the present invention, after the moisture has been removed by a dehumidifying tower filled with moisture absorbent for selectively adsorbing the moisture from the gas containing the organic substances and the moisture, the organic substances are adsorbed and removed under a relatively low temperature condition. The organic substances are desorbed under a relatively high temperature condition from the adsorbing tower which is saturated with the organic substances. The desorbed organic substances are liquefied and collected under a low temperature and/or pressurizing condition. The dry gas from which the organic substances have been removed and become harmless is heated if necessary. Thereafter, the dry gas is purged in a counter flow manner in the dehumidifying tower which is saturated with the moisture to perform the regeneration of the moisture absorbent and is discharged to the outside of the system together with the desorbed moisture. Also, part of the dry gas from which the organic substances have been removed is heated if necessary, and thereafter may be used as a purge gas for the adsorbing tower.

In the method according to the present invention, molecular sieve zeolites such as K-A, Na-A are used as the moisture selective adsorbent (moisture absorbent) used in the dehumidifying tower. Also, it is preferable to use a hydrophobic adsorbent which has a relatively low adsorbing power and is almost free from the adverse affect of moisture, as the organic adsorbent to be used in the adsorbing tower. More specifically, high silica zeolites, having a high silica/alumina ratio of 25 or more, such as ZSM-5 (made by Mobil Oil Co., Trade Name, silica/alumina ratio of 400), silicalite, USY (Ultra Stable Y type zeolite, by PQ Corp., Trade Name, silica/alumina ratio of 78), mordenite and the like, a low silica system zeolite such as Ca-X type zeolite, Na-X type zeolite, silica super fine granulated particle (for example, particle having an average particle size of 1.5 mm which has been obtained by granulating the silica super fine particle having a size of 0.1 μm or less), silica gel, γ-alumina, activated carbon and like may be exemplified.

In the method according to the present invention, it is sufficient to suitably determine the conditions of the temperature in the adsorbing tower and the dehumidifying tower depending upon the kind of organic substances to be collected, adsorbent or moisture absorbent, an off-gas condition, a design condition of a plant and the like. However, preferably, the relatively low temperature condition relating to the dehydrating process in the dehumidifying tower is in the range of 10° to 50° C., the relatively high temperature condition relating to the moisture absorbent regeneration process is in the range of 35° to 125° C., preferably, 35° to 80° C., more preferably, 35° to 75° C., the relatively low temperature condition relating to the adsorbing process in the adsorbing tower for the organic substances is in the range of −30° to 10° C., preferably, −20° to 8° C. and the relatively high temperature condition relating to the removing process for the organic substances is in the range of 35° to 125° C., preferably, 35° to 80° C., more preferably, 35° to 75° C.

In the method according to the present invention, the following operations or effects may be enjoyed.

(1) Since the gas is fed after the moisture has been removed from the gas containing the organic substances and the moisture, it is possible to carry out the adsorbing process for the organic substances at a low temperature, and since the regenerating process (removal process) may be carried out on the low temperature side corresponding to the temperature difference with respect to the decrement of the adsorbing temperature, it is possible to avoid the decomposition of the organic substances and the decomposition of the adsorbent.

(2) Since the adsorbing process for the organic substances is carried out at the low compensation thereby the adsorption amount to the adsorbent is increased, it is possible to reduce the amount of the adsorbent.

(3) By selectively removing the moisture from the system including the organic substances and the moisture, condensed water which would be formed by the conventional low temperature condensation is not produced, and it is possible to avoid a secondary contamination such as water pollution due to the dissolution of the organic substances in the condensed water.

(4) In the case where the dry gas containing the organic substances from which the moisture has been removed is cooled down to a low temperature, there is no consumption of the latent heat for the condensation of the moisture. Accordingly, it is possible to save the electric power, required for cooling by one fifth of the moisture coexistence phase.

(5) Since the organic substances to be collected from the regenerating process for the adsorbent is subjected to dehydration to such an extent that the moisture dew point is below −30° C., the liquefaction of the organic substances from the high concentration organic containing gas obtained in the regenerating process may be effectively carried out.

DESCRIPTION OF THE PREFERRED EMBODIMENTS

A method according to the present invention will now be descried on the basis of the following embodiments.

<Embodiment 1>

Figure 1:
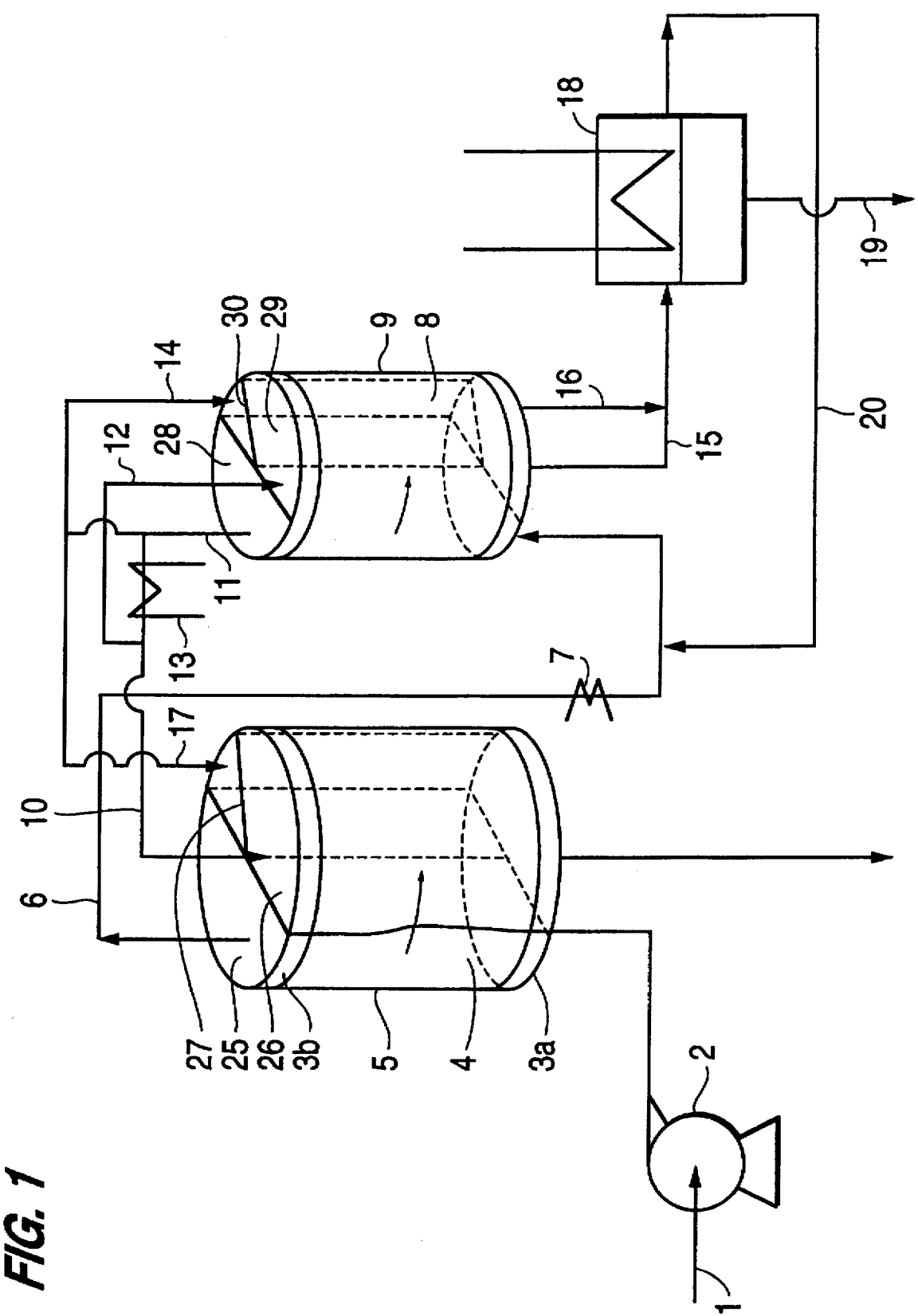
FIG. 1 is a schematic diagram showing a flow according to one embodiment of the invention.

FIG. 1 is a schematic view showing a system illustrating an example of an apparatus for embodying the method according to the present invention. An organic substances collecting test from off-gas discharged from a plant, including cyclohexanone of 1,000 ppm, MEK of 1,000 ppm, and toluene of 1,000 ppm as the organic substances and further including moisture of 2 vol. % using the apparatus shown in FIG. 1 was conducted.

In FIG. 1, a dehumidifying tower 5 is in the form of a cylinder and is filled with silica fibers having a honeycomb structure, as an adsorbent 4, carrying an Na-A zeolite for selectively adsorbing only the organic substances from a system containing the organic substances and the moisture. The dehumidifying tower 5 was divided into three regions 25, 26 and 27 for performing an adsorbing process, a regenerating process and a cooling process, respectively, at a lower valve plate 3a and an upper valve plate 3b. This dehumidifying tower was rotated through one turn once an hour for repeatedly performing the adsorbing process, the regenerating process and the cooling process in this order.

The off-gas (whose temperature is 25° C. and whose flow amount is 1,000 Nm³/h), having the above-described composition, fed from a flow path 1 is compressed to about 200 to 500 mmaq by a blower 2, and is fed to the adsorbing process region 25 of the dehumidifying tower 5. Only the moisture is adsorbed at about 25° C. The moisture is removed so that the dew point of the outlet of the dehumidifying tower 5 is about −60° C., and a dry gas 6 containing the organic substances whose content is kept substantially unchanged.

The dry gas 6 containing the organic substances and discharged from the dehumidifying tower 5 is cooled down to 5° C. in a cooler 7 and is fed to an adsorbing region 28 of the adsorbing tower 9 which has a similar structure as the dehumidifying tower 5. The adsorbing tower 9 is filled with a honeycomb carrying a high silica zeolite USY (Ultra Stable Y-type Zeolite: a $SiO_2/Al_2O_3$ ratio of 70) as adsorbent 8 for adsorbing the organic substances. The organic substances contained in the gas that has been fed into the adsorbing tower 9 is gradually adsorbed from the inlet of the tower. The resulting non-harmful dry gas 11 (having a dew point of −65° C. or less) is discharged from the outlet of the adsorbing tower 9.

The adsorbent 8 which has adsorbed the organic substances at a temperature of about 5° C. in the adsorbing process region 28 of the adsorbing tower 9 is introduced into the regenerating process region 29 by the rotation of the adsorbing tower 9. A purge gas 12 which is a part of the non-harmful gas, to be discharged from the outlet of the adsorbing tower 9, which has been heated at 75° C. in the heater 13 is caused to flow in the counter flow manner against the adsorbing process for removing and regenerating the organic substances. The more the purge gas 12 to be used in the regenerating process, the lower the regeneration temperature will become. However, since the condensate rate is reduced, the amount of the purge gas should be kept equal to or less than 30% of the absorbing process outlet gas. If not, the economic problem would be posed.

The adsorbent that has passed through the regenerating region 29 is introduced into the subsequent cooling process region 30, and part of the non-harmful dry gas 11 is fed in the counter flow manner at room temperature as the cooling gas 14 so that the next adsorbing process may be smoothly carried out.

The desorbed gas 15 discharged from the adsorbent regenerating process and containing the reduced and condensed organic substances about 3 to 20 times is merged into a pass-by gas 16 in the cooling process and is introduced into a low temperature liquefier 18 kept at −90° C. As a result, toluene, MEK, and cyclohexanone are condensed and are collected as the liquefied collected organic substances 19. A non-condensed gas 20 which has not been condensed in the low temperature liquefier 18 is recirculated into a supply gas to the adsorbing tower 9 through the liquefier 18.

With such an arrangement, the organic substances are kept in a closed cycle between the adsorbing tower 9 and the low temperature liquefier 18. Accordingly, if a layer height of the adsorbing tower 9 is sufficient so as not to cause the organic substances to flow by, the organic substances are collected in the liquefied condition when the organic substances reach a gas-liquid equilibrium concentration corresponding to a set temperature of the liquefier 18.

On the other hand, in the dehumidifying tower 5, when the adsorbing process is completed for the moisture absorbent 4 that has adsorbed the moisture, the moisture absorbent 4 is introduced into the regenerating process region 26 and is in contact with the purge gas 10 fed from above the dehumidifying tower 5 in the counter flow manner. The adsorbed moisture is desorbed and discharged as the non-harmful gas containing the moisture. As a result, the moisture absorbent 4 is regenerated. The non-harmful dry gas 11 which has been discharged from the outlet of the above-described adsorbing tower 9 and heated up to 75° C. in the heater 13 is used as the purge gas 10. The moisture absorbent 4 from which the moisture has been desorbed and which is kept at a high temperature is fed as part of the cooling gas 17 of the dry gas 11 which is made non-harmful at room temperature in the cooling process region 27 and is cooled down to the room temperature and returned back to the adsorbing processing region 25 through one turn. Incidentally, the interiors of the dehumidifying tower 5 and the adsorbing tower 9 are partitioned for each process region by partitioning plates. Furthermore, a suitable plurality of partitioning plates are provided in order to prevent the internal leakage in each process region, if necessary.

In the above-described apparatus, in view of the fact that the amount of adsorption to the organic substances is large, a high silica zeolite USY is used as the adsorbent 8. However, since the dew point of the inlet gas is equal to or less than −65° C., the hydrophobic property of the USY is not requisite. Since the USY is rather expensive, instead thereof, it is possible to use hydrophilic adsorbents such as X-type and Y-type zeolites. However, since it is said that the catalytic property of the adsorbent against the thermal decomposition of MEK and cyclohexanone is caused by aluminum contained in the zeolite, if the regeneration efficiency is enhanced (enhancement of the volume reduction condensation and reduction of amount of the adsorbent) by setting the regeneration temperature to a relatively high temperature, it is desirable to use the zeolite having a high $SiO_2/Al_2O_3$ ratio, for example, USY, irrespective of the hydrophobic property. However, since a pentacyl zeolite such as ZSM-5 (made by Mobil Oil Co., Ltd.) has a smaller window diameter of 6Å than X, Y and USY zeolites of 9 to 10 Å and its adsorption rate is decreased when used with a gas having a large molecular size such as organic substances, there are some cases that such a kind of zeolite could not be used depending upon the substance to be adsorbed.

The operational conditions of the adsorbing tower 9 were as follows: In the normal operation, the temperature of the adsorbing process was set at 5° C., the regeneration temperature was set at 75° C., the purge gas amount was set at 200 Nm³/h (about five times in volume reduction condensation ratio), and the gas having the inlet gas amount of 1,000 Nm³/h was introduced into the adsorbing tower 9 having a volume of 0.2 m³ and was processed at a rotational speed of 3 rph, so that the total concentration of 100 ppm of the outlet gas (indicated by reference numeral 11 in FIG. 1) was maintained against the total concentration of 3,000 ppm of the organic substances in the inlet gas (indicated by reference numeral 6 in FIG. 1 ). When the regeneration temperature of the adsorbing tower 9 was varied from 25° to −15° C., the concentration of the organic substances in the outlet gas was obtained as shown in FIG. 2.

Figure 2:
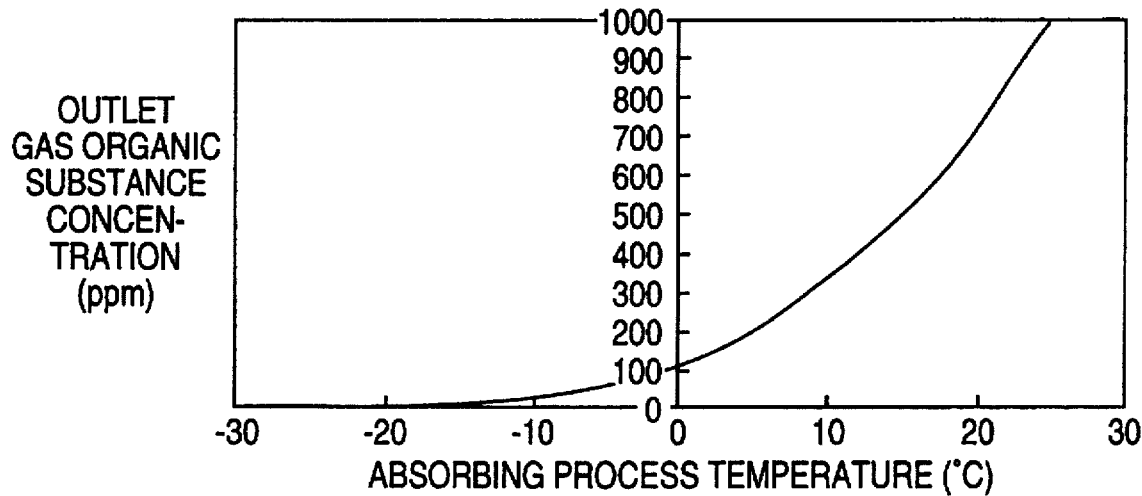
FIG. 2 is a graph showing a relationship between the temperature of a regenerating process in the adsorbing tower and the concentration of organic substances in the outlet gas.

As was apparent from FIG. 2, when the temperature of the adsorbing tower 9 exceeded 10° C., the concentration of the organic substances contained in the outlet gas exceeded 500 ppm so that the performance of the apparatus could not be maintained. On the other hand, when the temperature of the adsorbing tower 9 was below −5° C., the concentration of the organic substances of the outlet gas was further lowered in accordance with the drop of the temperature, and in case of −15° C., the concentration thereof was lowered down to 20 ppm. With respect to the separation of the organic substances, it was understood that the lower the temperature of the adsorbing process, the better the performance of the adsorbing tower would be. However, if an extremely low temperature was used, the load imposed on the refrigerator would be increased. Accordingly, in view of the consumption of electric power of the refrigerator, it is preferable to set the lower limit of the temperature to about −30°, more preferably, about 1° to 8° C.

In the operational conditions of the dehumidifying tower 5, in the normal operation, the temperature of the adsorbing process was set at 25° C., the regeneration temperature was set at 75° C., the entire amount of the outlet gas of 1,000 $Nm^3/h$ of the adsorbing tower 9 for the organic substances was used as the purge gas, and the inlet gas (indicated by reference numeral I in FIG.1) of an amount of 1,000 $Nm^3/h$ was introduced into the dehumidifying tower 5 having a volume of 0.25 $m^3$ and processed at a rotational speed of 1 rph so that the moisture dew point of −65° C. of the outlet gas (indicated by reference numeral 6 in FIG. 1) was kept against the inlet moisture dew point 15° C. When the amount of the purge gas in the regenerating process of the dehumidifying tower 5 was changed from 100 to 1,000 $Nm^3/h$ (entire amount), the moisture dew point of the outlet gas was changed as shown in FIG. 3.

Figure 3:
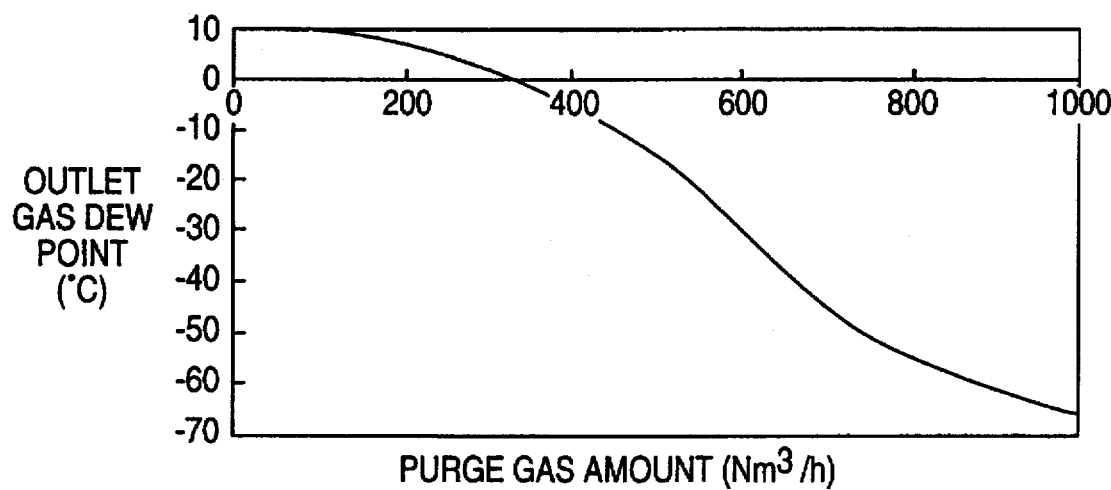
FIG. 3 is a graph showing a relationship between an amount of purge gas in the regenerating process in the dehumidifying tower and a dew point of the outlet gas of the adsorbing process.

As was apparent from FIG. 3, when the amount of purge gas is decreased to about 250 $Nm^3/h$ which was 25% of the amount of inlet gas, the dew point of the outlet gas was raised up to about 5° C. so that the drying ability of the off-gas would be insufficient. Namely, the regeneration of the moisture absorbent would be insufficient. In the apparatus, there was no remarkable economic problem even if all of the outlet gas of the adsorbing tower 9 for the organic substances was used for the regeneration purge. In this case, it was possible to attain the dehumidification at such a high efficiency that the outlet gas dew point of −65° or less was regarded as a critical limit. Also, at this time, since the regenerating temperature was 75° C., it is unnecessary to supply energy from the outside to the process in the dehumidifying tower 5.

Figure 4:
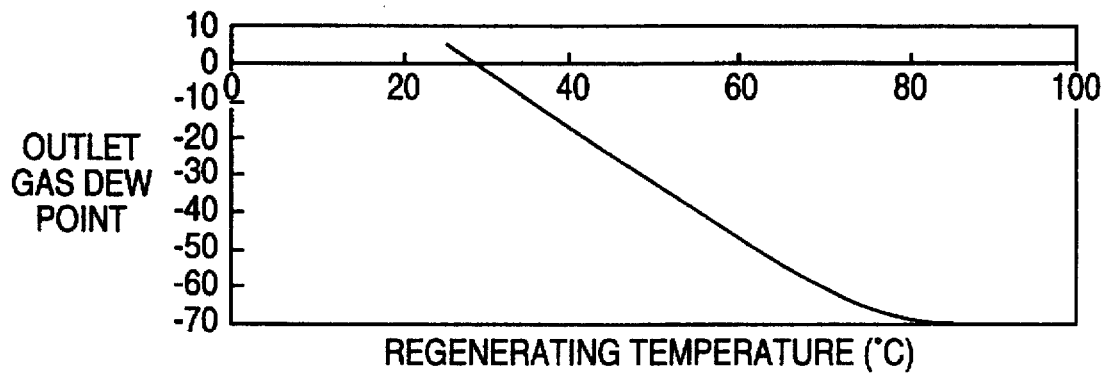
FIG. 4 is a graph showing a relationship between a regenerating temperature in the regenerating process in the dehumidifying tower and a dew point of the outlet gas in the adsorbing process.

Furthermore, FIG. 4 shows the case where the entire amount, 1,000 $Nm^3/h$ of the outlet gas of the adsorbing tower 9 for the organic substances was used and the regenerating temperature was changed from 25° to 75° C. As was apparent from FIG. 4, the outlet gas dew point at 25° C. was insufficient dehumidification at 5° C. If the regenerating temperature was raised up to 50° C., the outlet gas dew point was at −30° C. Accordingly, in this case, it was possible to sufficiently attain the object of the dehumidification.

In this embodiment, it was confirmed that the dry gas which was discharged from the adsorbing tower 9 for the organic substances and made harmless was used for the regeneration of the moisture absorbent in the dehumidifying tower 5 whereby almost without consuming the energy, the off-gas was dried, the dried off-gas containing the organic substances was adsorbed at a low temperature equal to or lower than the room temperature, the organic substances were adsorbed and removed, the adsorbed organic substances may be desorbed at a lower temperature corresponding to a shift of the temperature of the adsorbing process on the lower temperature side, and the organic substances might be collected with a high efficiency while avoiding the thermal decomposition.

Also, the collected organic substances were compared with a fresh organic substances through a desorbed pattern of FTIR, NMR and a gas-chromatograph. There was no difference therebetween. It was apparent from this that it was possible to collect the organic substances while avoiding the thermal decomposition according to the present invention.

In the example, the rotary cylindrical apparatus for the method of switching the flow paths of the gas in order, as the dehumidifying tower and the adsorbing tower in the embodiment, was used. It is apparent that the apparatus for carrying out the method of the invention is not limited to such a structure. Needless to say, it is possible to change the system so that, a plurality of dehumidifying towers and a plurality of adsorbing towers are provided and the adsorbing process, regenerating process and cooling process are carried out for every tower in a switching manner in order.

<Embodiment 2>

In case of the present invention, when the adsorbing process is switched over to the regenerating process in the dehumidifying process, a small amount of the organic substances adsorbed in the moisture absorbent dead volume portion and the moisture absorbent is delivered to the regenerating process, and the organic substances are contaminated into the gas which is made harmless and contains the moisture to be discharged from the regenerating process. Accordingly, this is not preferable in delimiting the organic substances concentration of the discharge gas. For this reason, the discharge gas of the regenerating process immediately after the switching over from the adsorbing process to the regenerating process is not discharged without any treatment to the outside of the system. The discharged gas is returned back to the inlet of the adsorbing process to avoid the discharge of the residual organic substances to the outside of the system. Thus, it is possible to suppress the organic substances concentration to be discharged from the apparatus to a lower level. The flow-by gas in the regenerating process immediately after the shift from the adsorbing process to the regenerating process was returned back to the inlet of the adsorbing process so that the concentration of the discharge gas from the dehumidifying tower operated under the same condition as that of the first embodiment was reduced from 100 ppm to 40 ppm.

According to the present invention, also with respect to a low concentration organic substances containing gas, it is possible to collect the organic substances at a high concentration magnification ratio without degrading the organic substances and the adsorbent. In addition, since there is no fear of freezing, it is possible to effectively carry out the liquefying and condensation.

Namely, first of all, only the moisture is removed by the temperature swing method (which is a method for separating the component gas by utilizing the adsorption amount difference of the adsorbents due to the temperature difference). Thereafter, the organic substances are collected by the temperature swing method. Thus, it is possible to collect the organic substances from the gas containing both the moisture and the organic substances with a low energy and a low temperature.

Also, since the organic substances may be collected at the low temperature, the degradation of the organic substances and the adsorbent is suppressed. Furthermore, if the dry off-gas from which the moisture and the organic substances have been removed is used in the regenerating process of the moisture absorbent the adsorbent, it is possible to form an extremely effective process.

What is claimed is:

1. A method for collecting the volatile organic substances by processing gas containing volatile organic substances and moisture with moisture absorbent and another adsorbent, comprising the following steps of:

introducing the gas containing the volatile organic substances and the moisture into a dehumidifying tower filled with the moisture absorbent for selectively adsorbing the moisture and being in a dehydrating process under a relatively low temperature condition to remove the moisture, and thereafter causing the gas to flow through an adsorbing tower filled with said another adsorbent and being in an adsorbing process under a relatively low temperature condition to adsorb and remove the volatile organic substances;

desorbing the adsorbed moisture, by causing the gas from which the moisture and the volatile organic substances have been removed, to pass through the dehumidifying tower being in a moisture absorbent regenerating process under a relatively high temperature condition, and discharging the gas outside the system together with the desorbed moisture;

causing a high concentration volatile organic substances containing gas the volatile organic substances adsorbed by causing part of the gas from which the moisture and the volatile organic substances have been removed, to pass through the adsorbing tower being in the removal process under a relatively high temperature condition;

introducing the high concentration volatile organic substances containing gas into a liquefier, cooling and/or pressurizing the gas to be liquefied to collect the volatile organic substances; and returning the gas from which the volatile organic substances have been separated in the liquefier, back to the adsorbing process for the volatile organic substances.

2. The method for collecting volatile organic substances according to claim 1, wherein said relatively low temperature condition relating to the dehydrating process in the dehumidifying tower is in the range of 10° to 50° C., said relatively high temperature condition relating to the moisture absorbent regenerating process is in the range of 35° to 125° C., said relatively low temperature condition relating to the adsorbing process in the adsorbing tower for the organic substances is in the range of −30° to 10° C., and the relatively high temperature condition relating to the removal process for the organic substances for the organic substances is in the range of 35° to 125° C.

3. The method for collecting volatile organic substances according to claim 1 or 2, wherein the dry gas which is downstream of said adsorbing tower being in the adsorbing process is used as a regenerating gas in the moisture absorbent regenerating process in said dehumidifying tower.

4. The method for collecting volatile organic substances according to claim 2, wherein an adsorbent having a silica/alumina ratio of 25 or more is used as said other adsorbent for adsorbing the volatile organic substances.

* * * * *